United States Patent
Lee et al.

(10) Patent No.: US 11,425,671 B2
(45) Date of Patent: Aug. 23, 2022

(54) SIDELINK SYNCHRONIZATION SIGNAL TRANSMISSION METHOD PERFORMED BY TERMINAL IN WIRELESS COMMUNICATION SYSTEM AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 16/339,788

(22) PCT Filed: Oct. 13, 2017

(86) PCT No.: PCT/KR2017/011351
§ 371 (c)(1),
(2) Date: Apr. 5, 2019

(87) PCT Pub. No.: WO2018/070845
PCT Pub. Date: Apr. 19, 2018

(65) Prior Publication Data
US 2020/0045660 A1 Feb. 6, 2020

Related U.S. Application Data

(60) Provisional application No. 62/407,541, filed on Oct. 13, 2016, provisional application No. 62/408,024, (Continued)

(51) Int. Cl.
*H04W 56/00* (2009.01)
*H04W 72/04* (2009.01)
*H04W 92/18* (2009.01)

(52) U.S. Cl.
CPC ... *H04W 56/0015* (2013.01); *H04W 72/0406* (2013.01); *H04W 92/18* (2013.01)

(58) Field of Classification Search
CPC .................. H04W 56/001; H04W 56/0015
See application file for complete search history.

(56) References Cited

U.S. PATENT DOCUMENTS

2016/0302250 A1* 10/2016 Sheng ................ H04W 4/70
2017/0012753 A1* 1/2017 Kim .................. H04W 56/002
(Continued)

FOREIGN PATENT DOCUMENTS

CN 103563270 A 2/2014
CN 105706511 A 6/2016
(Continued)

OTHER PUBLICATIONS

Cannon, Mark J., "On the Design of D2D Synchronization in 3GPP Release-12," In Communication Workshop (ICCW), 2015 IEEE International Conference on, pp. 633-638, Jun. 8-12, 2015, see sections II, V; and figure 1.
(Continued)

*Primary Examiner* — Shukri Taha
(74) *Attorney, Agent, or Firm* — Dentons US LLP

(57) ABSTRACT

Provided are a sidelink synchronization signal (SLSS) transmission method performed by a terminal in a wireless communication system and a terminal using the same. The method comprises: performing synchronization with one source among a plurality of sources; generating an SLSS; and transmitting the generated SLSS using one resource among a plurality of resources, wherein the one resource is determined according to whether the one source and the terminal are within cell coverage.

7 Claims, 11 Drawing Sheets

Related U.S. Application Data filed on Oct. 13, 2016, provisional application No. 62/417,347, filed on Nov. 4, 2016, provisional application No. 62/427,827, filed on Nov. 30, 2016, provisional application No. 62/428,547, filed on Dec. 1, 2016, provisional application No. 62/429,098, filed on Dec. 2, 2016.

(56) References Cited

U.S. PATENT DOCUMENTS

| | | | |
|---|---|---|---|
| 2017/0142703 A1* | 5/2017 | Xue | H04W 72/0453 |
| 2017/0289934 A1* | 10/2017 | Sheng | G01S 19/14 |
| 2018/0213498 A1* | 7/2018 | Khoryaev | H04W 56/0015 |
| 2018/0234928 A1* | 8/2018 | Yasukawa | H04W 92/18 |
| 2018/0270098 A1 | 9/2018 | Lee et al. | |
| 2018/0352525 A1* | 12/2018 | Li | H04B 7/18528 |
| 2019/0104450 A1* | 4/2019 | Adachi | H04W 36/0072 |
| 2021/0127341 A1* | 4/2021 | Yasukawa | H04W 56/001 |

FOREIGN PATENT DOCUMENTS

| | | |
|---|---|---|
| CN | 105992348 A | 10/2016 |
| WO | 2015-137773 | 9/2015 |
| WO | 2016022666 A1 | 2/2016 |
| WO | 2016108679 A1 | 7/2016 |
| WO | 2016108680 A1 | 7/2016 |
| WO | 2016-122202 | 8/2016 |
| WO | 2016126136 A1 | 8/2016 |

OTHER PUBLICATIONS

Huawei et al., "OOC Synchronization Priority and SLSS ID Set Definition," R1-166200, 3GPP TSG RAN WG1 Meeting #86, Gothenburg, Sweden, pp. 1-3, Aug. 12, 2016, see sections 1, 2.3.

Huawei et al., "Timing Alignment of Different Synchronization Sources for V2V," R1-166168, 3GPP TSG RAN WG1 Meeting #86, Gothenburg, Sweden, pp. 1-3, Aug. 12, 2016, see section 2.

CATT: "Synchronization enhancements in PC5-based V2V", R1-164210, XP051090055, 3GPP TSG RAN WG1 Meeting #85, Nanjing, China, May 23-27, 2016.

ZTE: "The remaining details of sidelink synchronization procedure", R1-166984, XP051125660, 3GPP TSG RAN WG1 Meeting #86, Gothenburg, Sweden, Aug. 22-26, 2016.

Search Report of European Patent Office in Appl'n No. 17859413.1, dated Nov. 20, 2019.

Search Report of European Patent Office in Appl'n No. 17859413.1, dated Aug. 14, 2019.

R1-162277: 3GPP TSG RAN WG1 Meeting #85, Busan, Korea Apr. 11-15, 2016, CATT, Discussion on physical ayer design for synchronization in PC5-based V2V, (5 Pages).

CATT, "Discussion on synchronization subframe", 3GPP TSG RAN WG1 Meeting #84, Feb. 15-19, 2016, R1-160362.

* cited by examiner

SIDELINK SYNCHRONIZATION SIGNAL TRANSMISSION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/011351, filed on Oct. 13, 2017, which claims the benefit of U.S. Provisional Applications No. 62/407,541 filed on Oct. 13, 2016, No. 62/408,024 filed on Oct. 13, 2016, No. 62/417,347 filed on Nov. 4, 2016, No. 62/427,827 filed on Nov. 30, 2016, No. 62/428,547 filed on Dec. 1, 2016, and No. 62/429,098 filed on Dec. 2, 2016, the contents of which are all hereby incorporated by reference herein in their entirety.

BACKGROUND OF THE INVENTION

Field of the Invention

The present invention relates to wireless communication, and more particularly, to a method in which a terminal transmits a sidelink synchronization signal/physical sidelink broadcast channel (PSBCH) in a wireless communication system, and the terminal using the method.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced (LTE-A) is one of promising candidates for the IMT-advanced.

Meanwhile, recently, there is a growing increase in a device-to-device (D2D) technique for performing direct communication between devices. In particular, the D2D is drawing attention as a communication technique for a public safety network. Although a commercial communication network is rapidly changing to LTE, the public safety network is primarily based on a 2G technique at present in terms of costs and a problem of a collision with the conventional communication protocol. Such a technical gap and a demand on an improved service results in an effort of improving the public safety network.

The public safety network has a higher service requirement (reliability and safety) in comparison with the commercial communication network, and in particular, even if cellular communication is performed in an out-of-coverage state or is not available, also demands direct signal transmission/reception between devices, i.e., a D2D operation.

The D2D operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

Meanwhile, in LTE-A, a UE-to-UE interface is referred to as a sidelink. For synchronization between UEs, it may be necessary to transmit a sidelink synchronization signal (SLSS) and a physical sidelink broadcast channel (PSBCH).

A UE may transmit the SLSS/PSBCH to another UE after performing synchronization on the basis of various synchronization references. Conventionally, the UE considers to transmit the SLSS/PSBCH by using a base station or another UE as a synchronization reference. However, in the future communication system, a new synchronization reference may be introduced. For example, a new synchronization reference may be introduced such as a global navigation satellite system (GNSS) capable of receiving a signal irrespective of whether the UE is in cell coverage of the base station.

As such, when the new synchronization reference is introduced, how to transmit the SLSS/PBSCH by the UE may be an issue to be considered. In addition, there may be a need to specify which SLSS/PSBCH will be relayed when the UE receives a plurality of SLSSs/PSBCHs having different synchronization references from other UEs.

SUMMARY OF THE INVENTION

The present invention provides an SLSS/PSBCH transmission method of a terminal in a wireless communication system, and the terminal using the method.

In one aspect, provided is a sidelink synchronization signal (SLSS) transmission method performed by a terminal in a wireless communication system. The method includes synchronizing with a single source out of a plurality of sources, generating the SLSS and transmitting the generated SLSS by using a single resource out of a plurality of resources. The single resource is determined according to whether the single source and the terminal are in cell coverage.

The single source may be a base station, another terminal, or a global navigation satellite system (GNSS).

The plurality of resources may comprise a first resource, a second resource, and a third resource.

The first resource may be used when the terminal is in cell coverage and the single source is a base station or a GNSS.

The second resource may be used when the terminal is out of cell coverage and the single source is another terminal in the cell coverage.

The third resource may be used when the terminal is out of cell coverage and the single source is a GNSS.

A physical sidelink broadcast channel (PSBCH) may be transmitted together when the SLSS is transmitted.

An indicator indicating whether the terminal is in cell coverage may be transmitted through the PSBCH.

The SLSS may be generated based on an SLSS identity (ID).

If the single source is a GNSS, a predetermined specific value may be used for the SLSS ID.

In another aspect, provided is a sidelink synchronization signal (SLSS) transmission method performed by a terminal in a wireless communication system. The method includes receiving two SLSSs on two resources and relaying a single SLSS out of the two SLSSs. An SLSS for which relatively high receive power is detected out of the two SLSSs is transmitted on a resource for which relatively low power is detected out of the two resources.

The terminal may be a terminal out of cell coverage.

The single SLSS may be transmitted together with a physical sidelink broadcast channel (PSBCH) received from another terminal in coverage.

In a still another aspect, provided is a terminal. The terminal includes a transceiver transmitting and receiving a radio signal and a processor operatively coupled to the transceiver. The processor is configured to: synchronize with a single source out of a plurality of sources, generate the SLSS and transmit the generated SLSS by using a single resource out of a plurality of resources. The single resource is determined according to whether the single source and the terminal are in cell coverage.

In a still another aspect, provided is a terminal including a transceiver transmitting and receiving a radio signal and a processor operatively coupled to the transceiver. The processor is configured to: receive two SLSSs on two resources and relay a single SLSS out of the two SLSSs. An SLSS for which relatively high receive power is detected out of the two SLSSs is transmitted on a resource for which relatively low power is detected out of the two resources.

According to the present invention, an SLSS/PSBCH can be transmitted while decreasing interference between terminals even if a new synchronization reference is introduced in a wireless communication system. In addition, when the terminal receives a plurality of SLSSs/PSBCHs having different synchronization references from other terminals, which SLSS/PSBCH will be transmitted and which resource will be used in transmission are clearly specified, thereby avoiding ambiguity and increasing SLSS/PSBCH transmission efficiency/reception efficiency.

DESCRIPTION OF EXEMPLARY EMBODIMENTS

Figure 1:
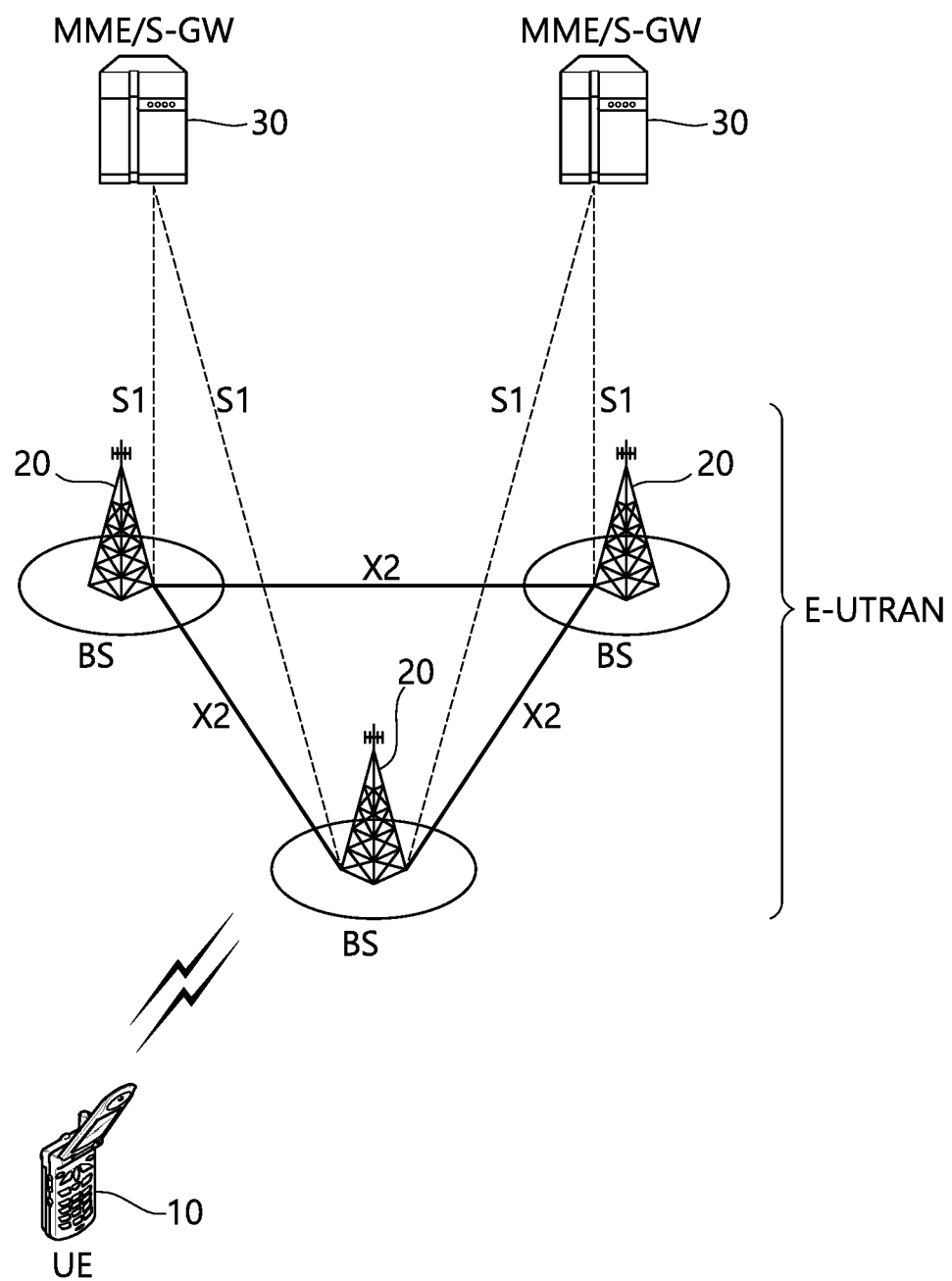
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
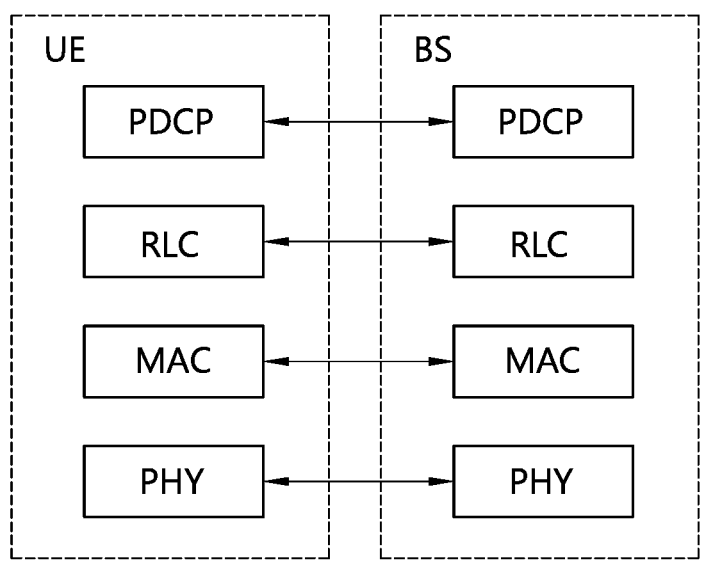
FIG. 2 is a diagram showing a wireless protocol architecture for a user plane.
Figure 3:
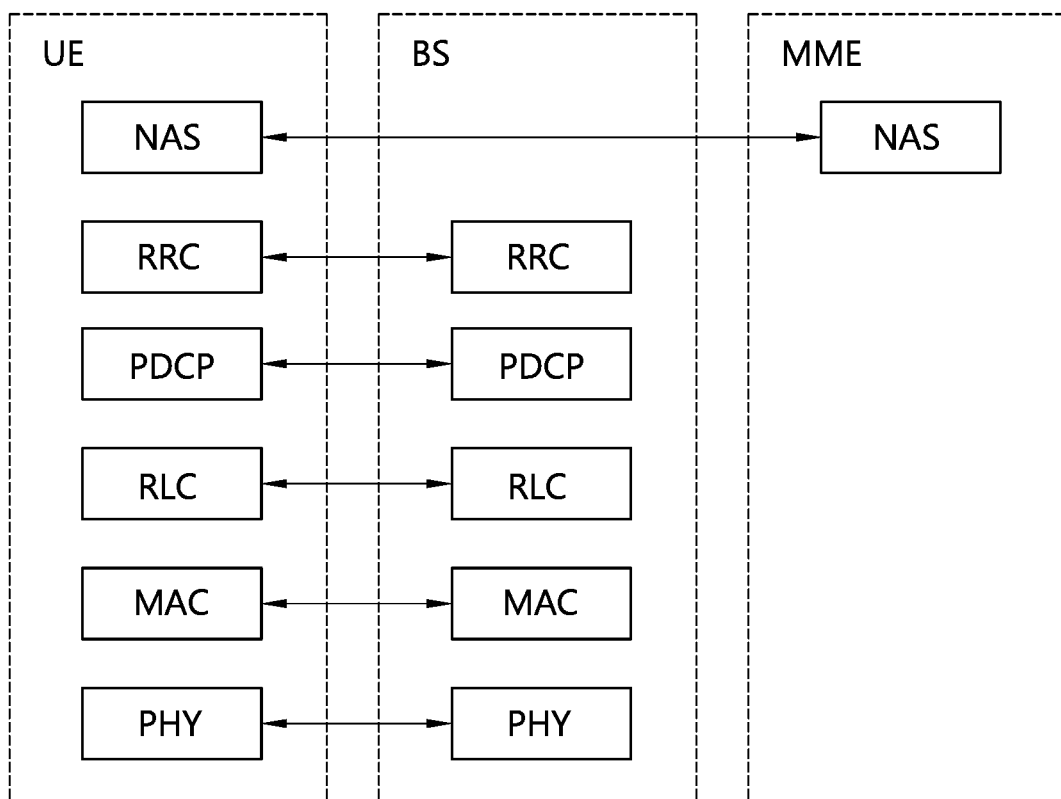
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
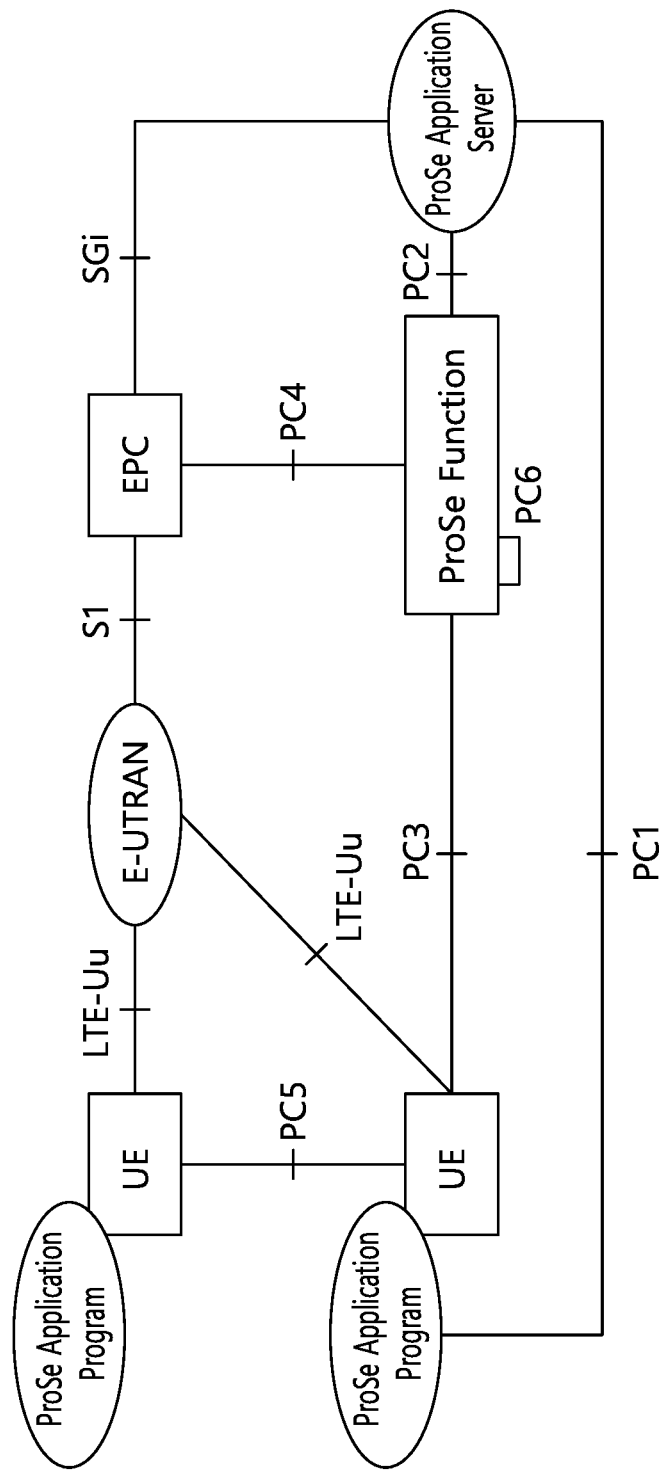
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
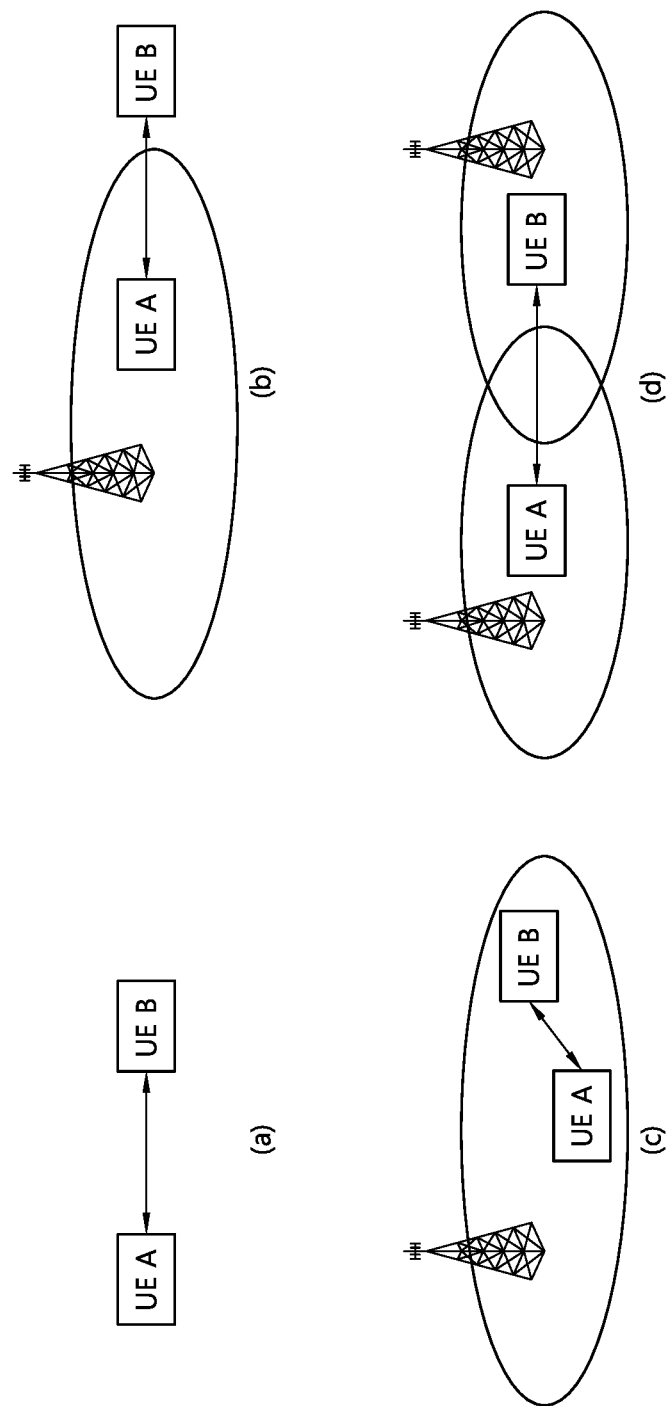
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

D2D operation may be performed between UEs in various locations as shown in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC5 interface may be used for D2D discovery. The PC5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Now, the present invention is described.

Hereinafter, the UE implies a UE used by a user. However, when network equipment such as a base station transmits/receives a signal according to a communication scheme between UEs, the network equipment may also be considered as a type of the UE.

For convenience of explanation, acronyms used in the present specification are described.

A PSBCH (Physical Sidelink Broadcast CHannel) is a physical sidelink broadcast channel. A PSCCH (Physical Sidelink Control CHannel) is a physical sidelink control channel. A PSDCH (Physical Sidelink Discovery CHannel) is a physical sidelink discovery channel. A PSSCH (Physical Sidelink Shared CHannel) is a physical sidelink shared channel. An SLSS (SideLink Synchronization Signal) is a sidelink synchronization signal. The SLSS may include a PSSS (Primary Sidelink Synchronization Signal) and an SSSS (Secondary Sidelink Synchronization Signal). The SLSS and the PSBCH may be transmitted together.

Herein, a sidelink may imply a UE-to UE interface. The sidelink may correspond to a PC5 interface. D2D communication may be referred to as sidelink communication or, simply, communication. D2D discovery may be referred to as sidelink discovery, or, simply, discovery. A D2D UE implies a UE for performing a D2D operation. The D2D operation may include at least one of the D2D communication and the D2D discovery.

Hereinafter, for convenience of explanation, the present invention is described on the basis of a 3GPP LTE/LTE-A system. However, a scope of systems to which the present invention is applied can also be extended to other systems in addition to the 3GPP LTE/LTE-A system.

Hereinafter, OOC means OUT-OF-COVERAGE. INC means IN-COVERAGE. V2X (vehicle-to-everything) means communication between a UE installed in a vehicle and any device. When any device corresponding to X in V2X is vehicle, pedestrian, or infrastructure, it may be indicated by V2V, V2P, or V2I, respectively. A V2X UE may be a UE supporting V2X communication.

Figure 6:
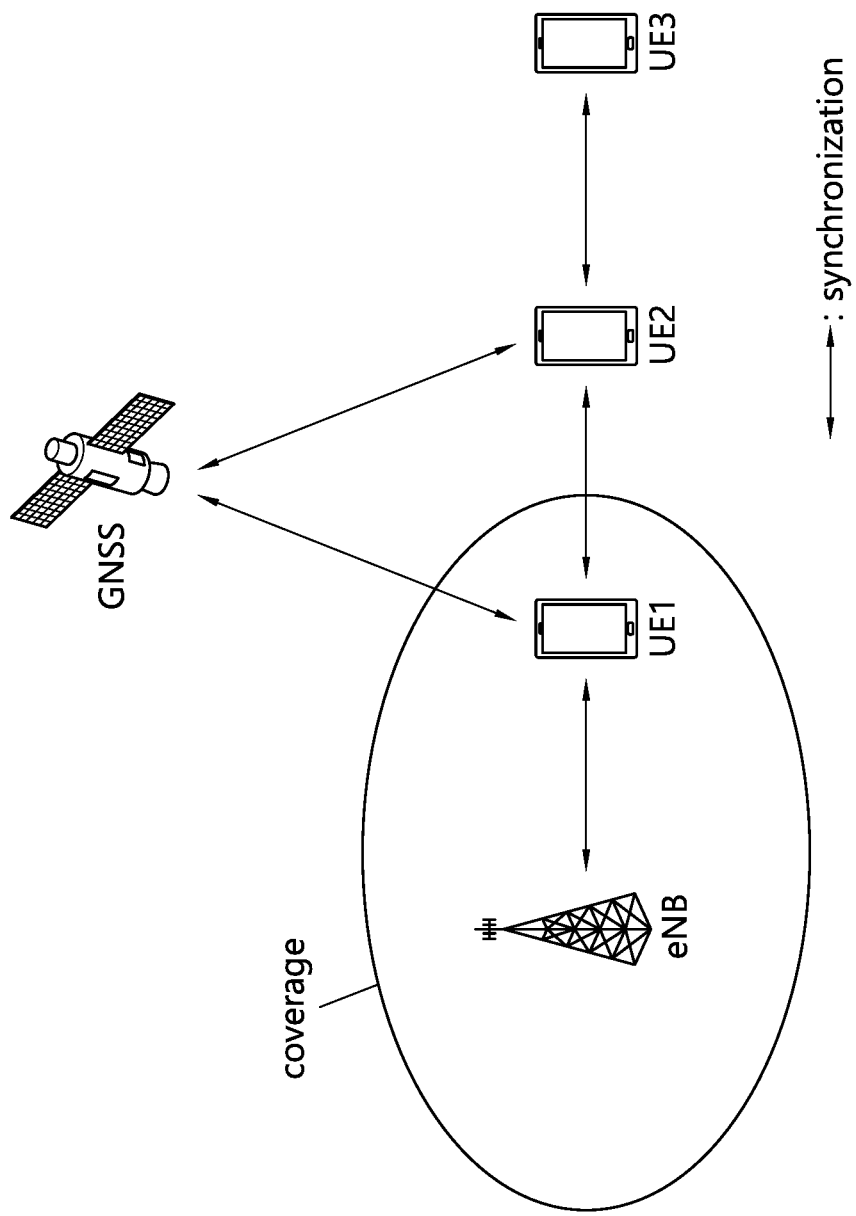
FIG. 6 exemplifies synchronization between various synchronization sources and UEs.

FIG. 6 exemplifies synchronization between various synchronization sources and UEs.

Referring to FIG. 6, a UE 1 is a UE in cell coverage of an eNB, and may perform synchronization with the eNB by directly receiving a signal required for synchronization from the eNB. In this case, the eNB may be a synchronization reference for the UE 1, and it may be expressed that the UE 1 is directly synchronized to the eNB. In addition, the UE 1 may perform synchronization with a global navigation satellite system (GNSS) by directly receiving a signal required for synchronization from the GNSS. In this case, the GNSS may be a synchronization reference for the UE 1, and it may be expressed that the UE 1 is directly synchronized to the GNSS. The UE 1 may transmit an SLSS/PSBCH for other UEs after being synchronized with the eNB or the GNSS.

A UE 2 is a UE out of cell coverage of the eNB, and may perform synchronization with the GNSS by directly receiving a signal required for synchronization from the GNSS. In this case, the GNSS may be a synchronization reference for the UE 2. In addition, the UE 2 may perform synchronization by receiving a signal required for synchronization from the UE 1. The UE 2 may transmit an SLSS/PSBCH for other UEs after being synchronized with the GNSS or the UE 1.

A UE 3 is a UE out of cell coverage of the eNB, and may perform synchronization by receiving a signal required for synchronization from the UE 2. All of the UEs 1, 2, and 3 may be V2X UEs supporting V2X.

An OOC V2X UE such as the UE 2 may perform an SLSS(/PSBCH) transmission operation, and for this, an SLSS(/PSBCH) resource may be configured. In case of an OOC V2X UE having a synchronization channel reference resource based on a GNSS, i) an SLSS(/PSBCH) resource on which a PSBCH(/SLSS) is relayed by receiving it from another V2X UE (e.g., INC V2X UE) and ii) an SLSS(/PSBCH) resource on which the UE (directly) selects a GNSS synchronization reference and thereafter transmits a PSBCH(/SLSS) may be differently (or independently) configured(/signaled) in a time domain. That is, an SLSS/PSBCH resource used when the UE 2 receives an SLSS/PSBCH from the UE 1 and transmits/relays this and an SLSS/PSBCH resource used when the SLSS/PSBCH is transmitted after performing synchronization with the GNSS may be configured/signaled differently or independently.

Herein, it may be interpreted that an SLSS(/PSBCH) resource (used in corresponding transmission(/relay)) is configured(/signaled) differently (or independently) (in a time domain) between a case (A) where PSBCH content(/SLSS) transmitted by an OOC V2X UE (having a GNSS synchronization reference) is generated(/caused) from another V2X UE and a case (B) where it is generated directly by itself, and/or it may be interpreted that PSBCH content(/SLSS) related to (the) cases (A) and (B) is (partially) different.

For example, according to whether a pre-configured(/signaled) condition is satisfied (e.g., in a case where a V2X operation is performed(/configured) and/or in case of a GNSS synchronization reference), the number of (OOC) SLSS(/PSBCH) resources may be differently configured(/signaled) (e.g., if a (corresponding) condition is satisfied, "3" (OOC) SLSS(/PSBCH) resources are configured(/signaled), and if the (corresponding) condition is not satisfied, "2" (OOC) SLSS(/PSBCH) resources may be configured(/signaled)).

For example, in case of the OOC V2X UE (having the GNSS synchronization reference), a PSBCH(/SLSS) transmission(/relay) operation may be performed by re-using (one) SLSS(/PSBCH) resource on which PSBCH(/SLSS) is received(/detected) from an INC V2X UE.

For example, the OOC V2X UE (having the GNSS synchronization reference) may be allowed to consider(/assume) an SLSS(/PSBCH) resource (e.g., a subframe #K (SF #K)) on which SLSS(/PSBCH) is received as a pre-configured(/signaled) X-th (e.g., "X=1") SLSS(/PSBCH) resource and to apply a pre-configured(/signaled) offset value OFFSET_VAL and then derive an (X+1)-th SLSS(/PSBCH) resource (e.g., a subframe #(K+OFFSET_VAL)).

For example, in case of the OOC V2X UE (having the GNSS synchronization reference), (one) SLSS(/PSBCH) resource (referred to as IN_SLSSRSC) used for PSBCH(/SLSS) reception from the INC V2X UE and/or (two) SLSS(/PSBCH) resources (referred to as OC_SLSSRSC#A, OC_SLSSRSC#B) used for its PSBCH (/SLSS) transmission(/relay/reception) may be (pre-)configured(/signaled) (or a plurality of (e.g., 3) SLSS(/PSBCH) resources used in its PSBCH(/SLSS) transmission(/relay/reception) may be (pre-)configured(/signaled)).

For example, in case of an OOC V2X UE which has detected an INC V2X UE (or eNB) related PSBCH(/SLSS) (referred to as IN_SLSS(/PSBCH)) on IN_SLSSRSC, a resource for which relatively low energy (e.g., S-RSSI or interference) is measured (and/or a resource for which PSBCH(/SLSS) (and/or PSCCH(/PSCCH)) (having a relatively high (synchronization channel) priority) transmitted by another OOC V2X UE is not detected) may be preferentially selected (or randomly selected) from OC_SLSSRSC#A and OC_SLSSRSC#B, and may be used in IN_SLSS(/PSBCH) transmission(/relay).

For example, if one of OC_SLSSRSC#A and OC_SLSSRSC#B is configured(/signaled) as a resource used in PSBCH(/SLSS) transmission of a V2X UE "directly synchronized to GNSS" (through a (predetermined) configuration), the OOC V2X UE may be allowed to perform IN_SLSS(/PSBCH) transmission(/relay) on the remaining resource other than a corresponding resource.

Herein, for example, if IN_SLSS(/PSBCH) is not detected (/received) on IN_SLSSRSC and/or if SLSS transmitted from another OOC V2X UE having a GNSS synchronization reference is detected(/received) (on the remaining some SLSS(/PSBCH) resources), a corresponding SLSS transmission(/relay) operation may be performed on the remaining resource other than a resource configured(/signaled) for PSBCH(/SLSS) transmission of the V2X UE "directly synchronized to GNSS" between OC_SLSSRSC#A and OC_SLSSRSC#B.

For example, the aforementioned (some) rules may be limitedly applied only when (predetermined) configuration content is equally configured in a network. Under the (some) rules of the present invention, the term "GNSS synchronization reference" may be interpreted as being "directly synchronized to GNSS" (and/or "indirectly synchronized to GNSS").

If a UE detects no eNB in a carrier which is configured as a carrier which potentially includes eNBs used as synchronization references, the following priority rules may be applied:

1) P1: GNSS, 2) P2: a UE directly synchronized to GNSS and a UE directly synchronized to eNB may have the same priority, 3) P3: a UE indirectly synchronized to GNSS and a UE indirectly synchronized to eNB may have the same priority, 4) The remaining UEs have the lowest priority.

The priority between P1 and P2 may be (pre-)configured.

If the UE has configured the GNSS as the synchronization reference, for the OOC case, SLSS and PSBCH may be transmitted every synchronization period when the UE is capable of SLSS/PSBCH transmission and the SLSS resource is pre-configured.

For the INC (IN COVERAGE) case, a D2D mechanism may be re-used. That is, an RSRP threshold or dedicated signaling may be used to determine SLSS transmission. When the GNSS has the highest priority, the UE is not expected to read SLSS from other UEs.

For the V2V PC5 SLSS, if the UE has selected the GNSS as the synchronization reference and the UE acts as a synchronization source, SLSS ID may be set to 0 for SLSS transmission.

Upon detecting an eNB in a carrier which is configured as a carrier which potentially includes eNBs used as synchronization references, if a GNSS is prioritized over the eNB by an eNB configuration, a UE directly or indirectly synchronized to the GNSS may have a higher priority than the eNB.

Two SLSS resources may be pre-configured for an OOC UE. One of the resources is used for SLSS of the UE's synchronization reference, and the other is used for SLSS transmission of the UE.

An OOC UE directly synchronized to GNSS transmits SLSS/PSBCH through one of the two predetermined synchronization resources.

In addition, in the other resource, the UE may receive PSBCH transmitted from an INC UE.

The GNSS may be added to a cell ID or may replace the cell ID.

The UE may select one synchronization reference at a time through a synchronization reference selection process.

A transmission resource pool configuration including a type of a synchronization reference allowed in using each resource pool may be provided.

The OOC UE which has selected the GNSS as the synchronization reference may read PSBCH on a pre-configured in-coverage resource even if the GNSS has the highest priority. The PSBCH transmitted from a UE which is not selected as the synchronization reference may not be read. A time location for PSBCH reception may be derived from GNSS timing.

For example, in case of an OOC V2X UE having a GNSS synchronization reference, upon receiving SLSS/PSBCH from an INC V2X UE on a pre-configured(/signaled) SLSS (/PSBCH) resource (referred to as SLRSCFRST), an SLSS/ PSBCH transmission(/relay) operation may be performed on SLRSCFRST (appearing in a next period) (other than an SLSS(/PSBCH) resource (SLRSCSEND) on which SLSS transmission based on pre-configured(/signaled) GNSS (time/frequency) synchronization and/or PSBCH transmission based on 'PRECONFIGURATION' information are performed), and 'TDD UL-DL configuration' information on (corresponding) PSBCH to be transmitted(/relayed) may be designated to be equal to that of a PSBCH received from the INC V2X UE. Accordingly, a '(PSBCH) SFN' effect may be obtained, and a V2X UE of the maximum possible range may be allowed to assume the same 'TDD UL-DL configuration' information.

For example, a (corresponding) OOC V2X UE may be allowed to receive PSBCH(/SLSS) transmitted from an INC V2X UE on SLRSCFRST while skipping a PSBCH(/SLSS) transmission(/relay) operation on SLRSCFRST with a pre-configured(/signaled) period (and/or with a specific ratio within pre-configured(/signaled) time and/or whenever performing a PSBCH(/SLSS) transmission(/relay) operation by the number of times pre-configured(/signaled) (on SLRSCFRST)). This may aim to perform the PSBCH transmission(/relay) operation, for example, by considering a case where 'TDD UL-DL configuration' information of the INC (V2X UE) is updated(/changed). Additionally/alternatively, this may aim to (re)determine whether the INC V2X UE is present(/detected).

For example, all cells on a network may be allowed to match (INC communication related) 'TDD UL-DL configuration' information and/or 'TDD UL-DL configuration' information on 'PRECONFIGURATION' information. The above rule may be useful when 'V2X resource pool bitmap' (to be applied) is differently interpreted for each 'TDD UL-DL configuration'.

For example, a V2X UE which has selected (another) V2X UE of 'SLSS ID=0' as (its) 'synchronization reference' may be allowed to designate to 'SLSS ID=168' when performing an SLSS(/PSBCH) transmission(/relay) operation. SLSS(/PSBCH) of 'SLSS ID=168' may be allowed to have the same priority as SLSS(/PSBCH) satisfying conditions (A) 'SLSS ID=1~167' and/or (B) 'IN-COVERAGE INDICATOR=IN-COVERAGE' (or 'IN-COVERAGE INDICATOR=OUT-COVERAGE').

For another example, according to the following (some) rules, a V2X communication related "SYNCHRONIZATION SIGNAL (SS)" (and/or "PHYSICAL SIDELINK BROADCAST CHANNEL (PSBCH)") transmission operation may be performed.

SLSS/PSBCH transmission and reception are up to UE capability. A configuration for an OOC UE may include zero, two, or three synchronization resources.

If zero synchronization resource is configured, SLSS/PSBCH transmission/reception is not performed.

When two synchronization resources are included, the same synchronization resource is used for a UE directly synchronized to GNSS. The UE directly synchronized to GNSS may not be required to monitor PSBCH on the other resource.

A UE which has selected SLSS ID=0 with 'COVERAGE INDICATOR'=1 as its synchronization reference may transmit SLSS with SLSS ID=0, 'COVERAGE INDICATOR'=0. 'COVERAGE INDICATOR' may be used to differentiate whether it is directly synchronized or indirectly synchronized to GNSS.

SLSS ID 0 or 168 may be used to differentiate whether it is a 1-hop synchronization signal or a multi-hop synchronization signal in GNSS-based synchronization.

Figure 7:
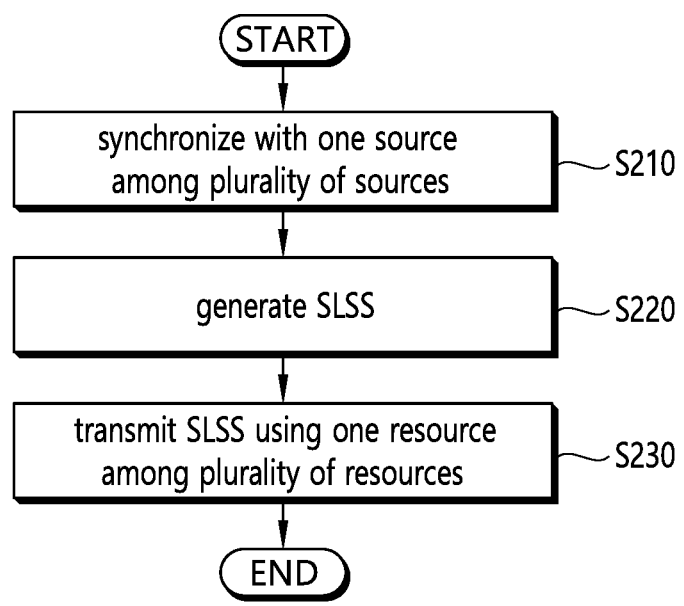
FIG. 7 exemplifies an SLSS transmission method of a UE according to an embodiment of the present invention.

FIG. 7 exemplifies an SLSS transmission method of a UE according to an embodiment of the present invention.

Referring to FIG. 7, the UE is synchronized to a single source out of a plurality of sources (S210), and generates SLSS (S220). When generating the SLSS, a sequence may be generated based on an SLSS ID. The SLSS ID may be determined differently according to what is the single source.

The UE transmits the generated SLSS by using a single resource out of a plurality of resources (S230). In this case, the single resource may be determined according to whether the single source and the UE are in cell coverage. In this case, the single source may be, for example, an eNB, another UE, or a global navigation satellite system (GNSS).

For example, when the plurality of resources are three resources (resources 1 2, and 3), the UE may perform operations shown in the following table.

TABLE 1

| UE synchronization state | Resource 1 ("InC resource" or "1st OoC resource") | Resource 2 ("2nd OoC resource") | Resource 3 ("GNSS resource") | Notes |
|---|---|---|---|---|
| UE is InC, sync to eNB | Synchronization signal (SS), PSBCH transmission from NW | | | LTE-A R12/13 solution |
| UE is OoC, synchronized to InC UE with/without GNSS | Reserved SLSS ID (e.g., SLSS ID = 0), PSBCH transmission | | | PSBCH used to protect UEs in cell coverage. Note that PSBCH should be transmitted on the first resource to avoid interference with OoC GNSS UE's PSBCH. |
| UE is OoC, synchronized to OoC UE with SS_net with/without GNSS | | SS, PSBCH(InC_flag = 0) transmission from NW | | LTE-A R12/13 solution |
| UE is OoC, synchronized to OoC UE with SS_oon and with/without GNSS | SS, PSBCH(InC_flag = 0) transmission from OoC UE | | | LTE-A R12/13 solution |

TABLE 1-continued

| UE synchronization state | Resource 1 ("InC resource" or "1st OoC resource") | Resource 2 ("2nd OoC resource") | Resource 3 ("GNSS resource") | Notes |
|---|---|---|---|---|
| UE is isolated and without GNSS | SS, PSBCH(InC_flag = 0) transmission from OoC UE. The sync resource is determined depending on the resource of the incoming synch source. | | | LTE-A R12/13 solution |
| UE is OoC, synchronized to GNSS | SS, PSBCH(InC_flag = 0) (random sync resource) transmission from OoC UE | | | LTE-A R12/13 solution |
| UE is OoC, synchronized to InC UE with/ without GNSS | SS, PSBCH(InC_flag = 0) transmission from OoC UE (random sync resource) | | Reserved SLSS ID (e.g., SLSS ID = 0), PSBCH transmission | PSBCH only includes DFN-related fields. The third resource is needed to avoid interference to cell-edge UEs. |

The resource 1 (the first resource) may be used when the UE is in cell coverage and the single source is the eNB or the GNSS. The resource 2 (the second resource) may be used when the UE is out of cell coverage and the single source is another UE in cell coverage. The resource 3 (the third resource) may be used when the UE is out of cell coverage and the single source is the GNSS. The UE may transmit a physical sidelink broadcast channel (PSBCH) together when transmitting the SLSS. Through the PSBCH, an indicator (COVERAGE INDICATOR, hereinafter, also referred to as an InC indicator) indicating whether the UE is in cell coverage may be transmitted. In Table 1 above, InC_flag corresponds to the aforementioned COVERAGE INDICATOR (InC indicator). SLSS may be generated based on SLSS ID (identity). If the single source is the GNSS, the SLSS ID may be a predetermined specific value, for example, 0.

Figure 8:
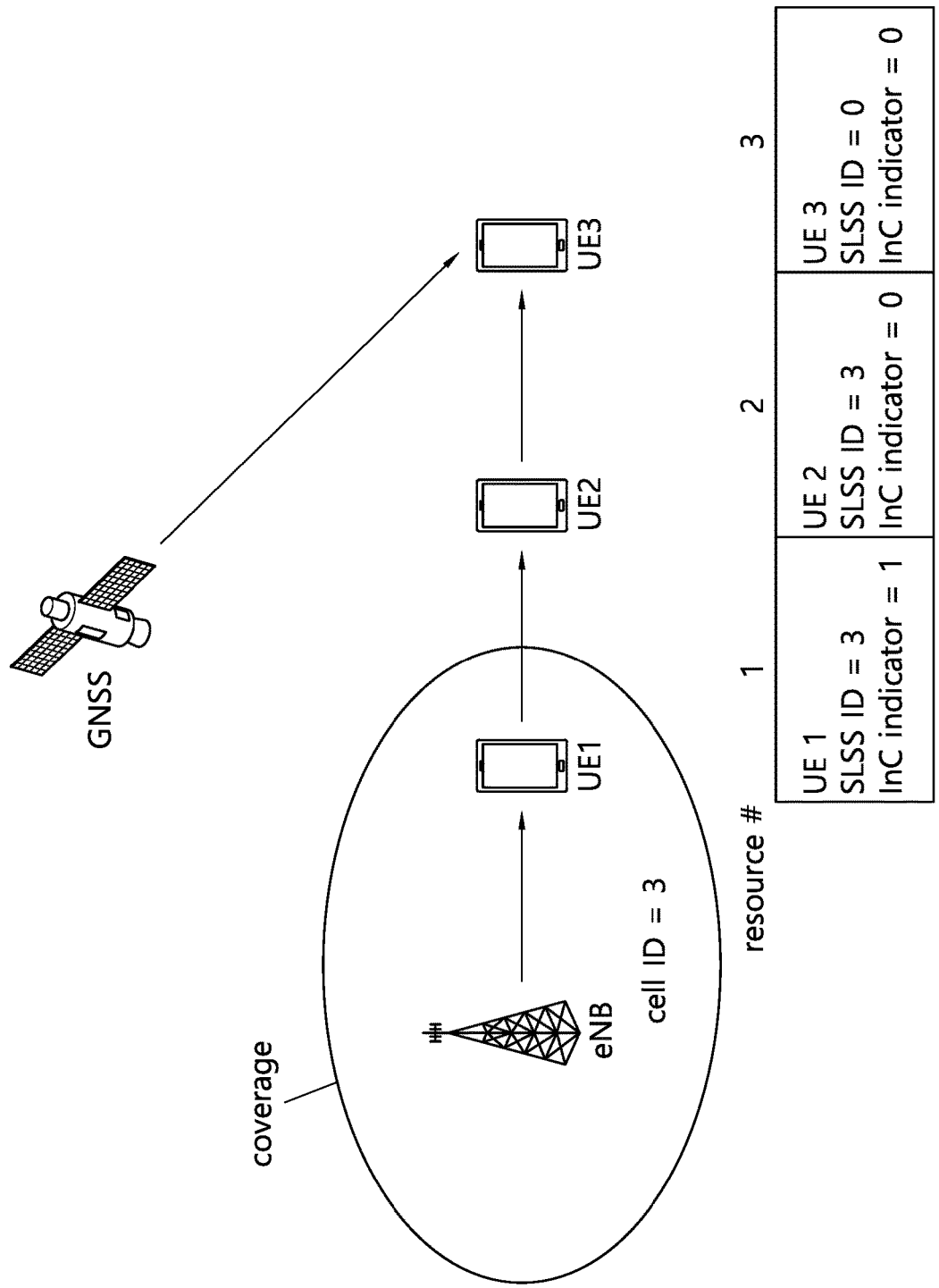
FIG. 8 exemplifies a specific example to which the method of FIG. 7 and Table 1 is applied.

FIG. 8 exemplifies a specific example to which the method of FIG. 7 and Table 1 is applied.

Referring to FIG. 8, an eNB may transmit a synchronization signal with cell ID=3. A UE 1 is a UE in cell coverage, and may perform synchronization by using the eNB as a synchronization reference. The UE 1 may transmit SLSS(/PSBCH) by using a resource #1 among pre-configured resources #1, 2, and 3. In this case, the UE 1 may transmit SLSS/PSBCH with SLSS ID=3, InC indicator=1.

A UE 2 is a UE out of cell coverage, and may perform synchronization by using the UE 1 as a synchronization reference. The UE 2 may transmit SLSS(/PSBCH) by using a resource #2 among pre-configured resources #1, 2, and 3. In this case, the UE 2 may transmit SLSS/PSBCH with SLSS ID=3, InC indicator=0.

A UE 3 is a UE out of cell coverage, and may perform synchronization by using a GNSS as a synchronization reference. The UE 3 may transmit SLSS(/PSBCH) by using a resource #3 among pre-configured resources #1, 2, and 3. In this case, the UE 3 may transmit PSBCH including a predetermined specific value, i.e., SLSS with SLSS ID=0 and Inc indicator=0.

According to the present invention, SLSS/PSBCH can be transmitted while reducing interference between V2X UEs in a communication system in which a new synchronization source (e.g., GNSS) not conventionally used is added. This is because a resource for transmitting SLSS/PSBCH based on the new synchronization source (GNSS) can be newly given without overlapping with a resource for transmitting SLSS/PSBCH based on the existing eNB or another UE.

In addition, according to the present invention, the SLSS ID of the SLSS may vary by considering which synchronization reference is used for the UE and whether the UE is in cell coverage or the like, and content of the PSBCH may vary.

When the aforementioned rule is applied, the following (some) methods(/rules) may be applied additionally or together.

For example, in (Method #2-2), it may be interpreted that a "synchronization resource" that can be used (in SS(/PSBCH) transmission(/relay)) is (partially) differently configured(/signaled) according to whether an (initial) "synchronization reference(/source)" is GNSS or eNB (and/or according to whether it is SS(/PSBCH) transmission (/relay) derived from the (initial) "synchronization reference (/source)" of GNSS or eNB).

EXAMPLE #1-1

When two resources are included, the following operation may be applied for an OOC UE.

The same synchronization resource (the first or second synchronization resource in 'PRECONFIGURATION') is used for a UE directly synchronized to GNSS.

SLSS ID=0, and IN-COVERAGE indicator (InC indicator) may be 1.

The UE directly synchronized to GNSS may not be required to monitor PSBCH on the other resource.

When determining a subframe used in transmission of SLSS/PSBCH from SLSS synchronized to the OOC UE, one is used for SLSS of a UE's synchronization reference, and the other is used for SLSS transmission of the UE.

A UE which has selected SLSS with SLSS ID=X (herein, X is any one value in the range of 0~167) and IN COVERAGE indicator=1 as a synchronization reference may transmit SLSS with SLSS ID=X, IN COVERAGE indicator=0.

A UE which has selected SLSS with SLSS ID=X (herein, X is any one value in the range of 0~167) and IN COVERAGE indicator=0 as a synchronization reference may transmit SLSS with SLSS ID=X+168, IN COVERAGE indicator=0.

A UE which has selected SLSS with SLSS ID=Y (herein, Y is any one value in the range of 168~335) and IN COVERAGE indicator=0 as a synchronization reference may transmit SLSS with SLSS ID=Y, IN COVERAGE indicator=0.

A UE which has not selected any SLSS as the synchronization reference randomly selects a synchronization resource. In this case, the SLSS ID is randomly selected from [168~335], and IN COVERAGE indicator=0 may be selected.

EXAMPLE #1-2

When two resources are included, the following operation may be applied to an OOC UE.

The SLSS ID 168 may be used to differentiate 1 hop and more hops from GNSS. A standalone UE may select the SLSS ID from [168~335].

When selecting a synchronization resource for SLSS/PSBCH transmission, two synchronization resources may be included in a candidate set. One is used for SLSS of a UE's synchronization reference, and the other is used for SLSS transmission of the UE.

When determining SLSS ID and IN COVERAGE indicator for SLSS/PSBCH transmission, a UE which has selected SLSS with SLSS ID=X (herein, X is any one value in the range of 0~167) and IN COVERAGE indicator=1 as a synchronization reference may transmit SLSS with SLSS ID=X, IN COVERAGE indicator=0.

A UE which has selected SLSS with SLSS ID=X (herein, X is any one value in the range of 0~167) and IN COVERAGE indicator=0 as a synchronization reference may transmit SLSS with SLSS ID=X+168, IN COVERAGE indicator=0.

A UE which has selected SLSS with SLSS ID=Y (herein, Y is any one value in the range of 168~335) and IN COVERAGE indicator=0 as a synchronization reference may transmit SLSS with SLSS ID=Y, IN COVERAGE indicator=0.

A UE which has not selected any SLSS as the synchronization reference randomly selects a synchronization resource. In this case, the SLSS ID is randomly selected from [168~335], and IN COVERAGE indicator=0 may be selected.

When two synchronization resources are pre-configured, a synchronization resource for in-coverage is selected from two resources for out-of-coverage.

A UE directly synchronized to GNSS transmits SLSS/PSBCH on a second synchronization resource. In this case, SLSS ID=0, and IN COVERAGE indicator may be 1. The UE is not required to monitor PSBCH on another resource.

EXAMPLE #2-1

When three resources are included, the following operation may be applied for an OOC UE.
<Method #2-1-1>
UEs directly synchronized to GNSS may use the same synchronization resource (the third source in PRECONFIGURATION).

In this case, SLSS ID=0, and IN COVERAGE indicator may be 0 or 1 or a predetermined value in the range of 0 and 1. In addition, the UE directly synchronized to GNSS may monitor PSBCH with SLSS ID=0 on a first synchronization resource.

A UE which has selected SLSS with SLSS ID=X (herein, X is any one value in the range of 0~167) and IN COVERAGE indicator=1 as a synchronization reference may transmit SLSS with SLSS ID=X, IN COVERAGE indicator=0. In this case, a second synchronization resource may be used in PRECONFIGURATION.

A UE which has selected SLSS with SLSS ID=X (herein, X is any one value in the range of 0~167) and IN COVERAGE indicator=0 as a synchronization reference may transmit SLSS with SLSS ID=X+168, IN COVERAGE indicator=0. In this case, a first synchronization resource may be used in PRECONFIGURATION.

A UE which has selected SLSS with SLSS ID=Y (herein, Y is any one value in the range of 168~335) and IN COVERAGE indicator=0 as a synchronization reference may transmit SLSS with SLSS ID=Y, IN COVERAGE indicator=0. In this case, a first synchronization resource or a second synchronization resource may be used in PRECONFIGURATION.

A UE which has not selected any SLSS as the synchronization reference randomly selects a synchronization resource from the first synchronization resource and the second synchronization resource. In this case, the SLSS ID is randomly selected from [168~335], and IN COVERAGE indicator=0 may be selected.

<Method #2-1-2>
UEs directly synchronized to GNSS may use the same synchronization resource (the third source in PRECONFIGURATION).

In this case, SLSS ID=0, and IN COVERAGE indicator may be 0 or 1 or a predetermined value in the range of 0 and 1. In addition, the UE directly synchronized to GNSS may monitor PSBCH with SLSS ID=0 on a first synchronization resource.

The UE may monitor PSBCH with SLSS ID=0 on a first synchronization resource.

EXAMPLE #2-2

When three resources are included, the following operation may be applied for an OOC UE.

Three synchronization resources may be configured through PRECONFIGURATION. In this case, a synchronization resource for in-coverage is aligned with a first synchronization resource of PRECONFIGURATION.

A UE directly synchronized to GNSS transmits SLSS/PSBCH on a third synchronization resource.

In this case, SLSS ID=0, and IN COVERAGE indicator may be 0. The UE monitors PSBCH with SLSS ID=0 on a first synchronization resource, and receives SLSS/PSBCH on a second synchronization resource according to the received PSBCH.

According to the following (some) rules, a V2X communication related "SS" (and/or "PSBCH") transmission operation may be performed.

TABLE 2

| Parameter | | NW | UE2 in coverage | UE2 in partial coverage | GNSS OOC UE1 | GNSS INC UE1 | UE2 directly sync to GNSS OOC UE1 | UE2 directly sync to GNSS INC UE1 | UE2 indirectly sync to GNSS OOC UE1 | UE2 indirectly sync to GNSS INC UE1 | UE2 out of network | None |
|---|---|---|---|---|---|---|---|---|---|---|---|---|
| UE1 acts as Sync Ref UE | | In coverage | In partial coverage | OON | Directly sync to GNSS | In coverage | Indirectly sync to GNSS | In coverage | Indirectly sync to GNSS | In coverage | OON | OON |
| Resource 1 (NW) | SLSSID | Same as incoming from NW | — | Incoming + 168 | — | Same as incoming from NW | — | Same as incoming from NW | — | Same as incoming from NW | — | — |
| | InC bit | 1 | — | 0 | — | 1 | — | 1 | — | 1 | — | — |
| | PSBCH (except InC bit and DFN) | Same as incoming from NW | — | Same as incoming | — | Same as incoming from NW | — | Same as incoming from NW | — | Same as incoming from NW | — | — |
| Resource 2 | SLSSID | — | Same as incoming | — | Same as incoming | — | Incoming + 168 (=168) | — | Same as incoming (=168) | — | Incoming | Random {169, ..., 335} |
| | InC bit | — | 0 | — | 0 | — | 0 | — | 0 | — | 0 | 0 |
| | PSBCH (except InC bit and DFN) | — | Same as incoming | — | Same as incoming | — | Same as incoming | — | Same as incoming | — | Preconf | Preconf |
| Resource 3 (GNSS) | SLSSID | — | — | — | 0 | — | — | — | — | — | — | — |
| | InC bit | — | — | — | 0 | — | — | — | — | — | — | — |
| | PSBCH (except InC bit and DFN) | — | — | — | GNSS Preconf (only DFN) | — | — | — | — | — | — | — |
| Notes | | Rel 12/13 solution | Rel 12/13 solution | Rel 12/13 solution | Resource 2 is only used if UE1 reads PSBCH with InC bit = 1 | Rel 12/13 splution (using GNSS timing) | | | | | | |

-continued

| | Sync Ref used by UE1 and UE1 coverage state | | | | | |
|---|---|---|---|---|---|---|
| | UE2 directly sync to GNSS | | UE2 indirectly sync to GNSS | | UE2 out of network | None |
| Parameter | OOC UE1 | INC UE1 | OOC UE1 | INC UE1 | | |
| Notes | | This case is only relevant if GNSS timing is prioritized over eNB | Resource 1 or 2 is used, depending on incoming SLSS | This case is only relevant if GNSS timing is prioritized over eNB | Resource 1 or 2 is used, depending on incoming SLSS Rel 12/13 solution | Decide randomly to use Resource 1 or 2 Rel 12/13 solution |

Meanwhile, in FIG. 8, the UE 3 may receive SLSS/PSBCH from the UE 2 through a plurality of resources. In this case, which SLSS/PSBCH will be relayed/transmitted by the UE 3 among SLSSs/PSBCHs received through the plurality of resources may be an issue to be considered.

Figure 9:
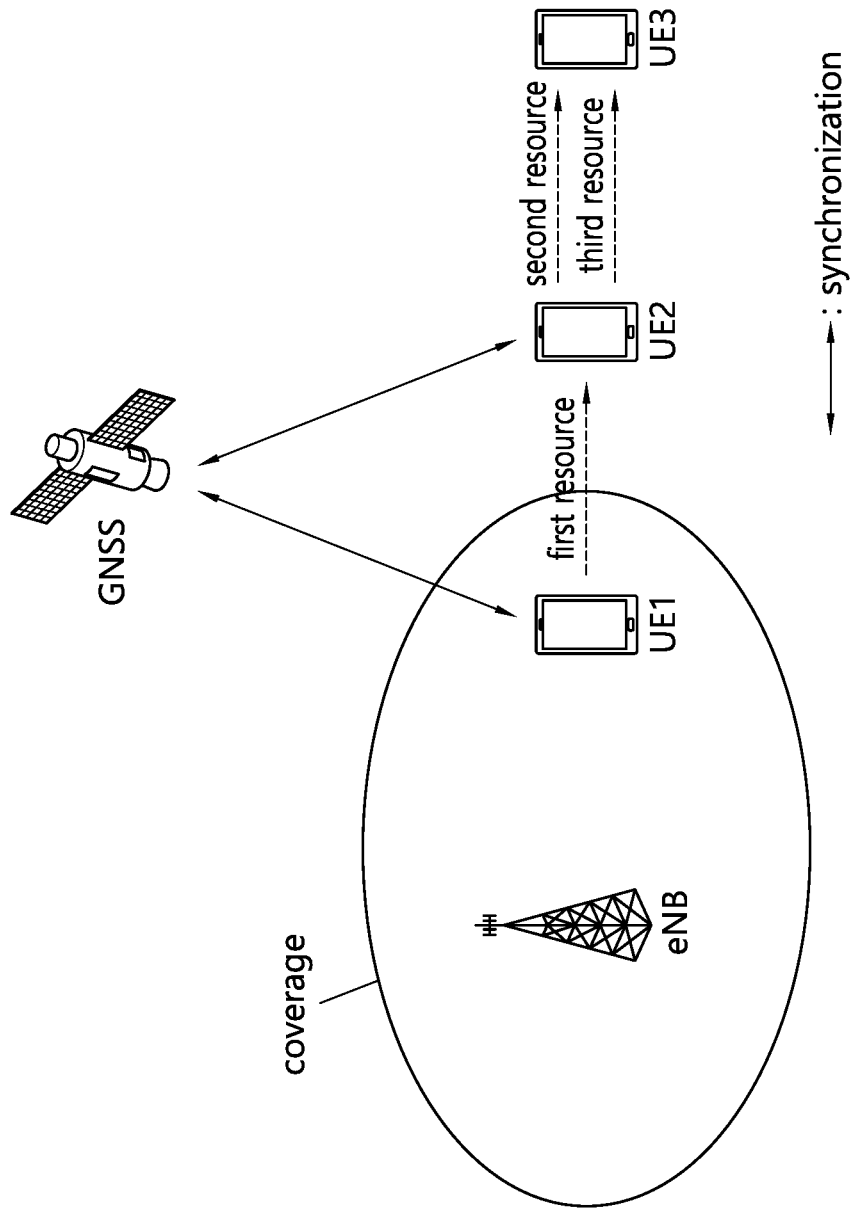
FIG. 9 exemplifies a case where a UE 3 receives SLSS/PSBCH from a UE 2 through a plurality of resources.

FIG. 9 exemplifies a case where a UE 3 receives SLSS/PSBCH from a UE 2 through a plurality of resources.

Referring to FIG. 9, a UE 1 is an in-coverage UE, and is a UE directly synchronized to GNSS. In this case, the UE 1 may perform SLSS/PSBCH transmission based on "IN-COVERAGE indicator (InC indicator)=1, SLSS ID=0" on a "resource 1 (first resource)".

The UE 2 is an out-coverage UE, and is a UE directly synchronized to GNSS. By (successfully) receiving PSBCH (/SLSS) transmitted from the UE 1 on the "resource 1", (updated) PSBCH(/SLSS) based on "IN-COVERAGE indicator (InC indicator)=0, SLSS ID=0" on a "resource 2 (second resource)" is relay-transmitted (e.g., for the purpose of transmitting "IN-COVERAGE PSBCH" information), and SLSS/PSBCH based on "IN-COVERAGE indicator (InC indicator)=0, SLSS ID=0" is transmitted (according to PRECONFIGURATION) on a "resource 3". The UE 3 is an out-coverage UE, and is a UE synchronized to another UE directly synchronized to GNSS. It is assumed that the UE 3 cannot successfully receive SLSS/PSBCH (based on "IN-COVERAGE indicator=1, SLSS ID=0") transmitted by the UE 1 on the "resource 1".

As such, the UE 3 may have to select SLSS/PSBCH to be relay-transmitted among (a plurality of) SLSS/PSBCH received ((relay-)transmitted from another UE) on a resource 2 and a resource 3 (a second resource and a third resource). A method of (effectively) selecting a resource to be used in (corresponding) SLSS/PSBCH relay-transmission is as follows.

The out-coverage UE 3 may be allowed to perform a relay operation for (detected) PSBCH(/SLSS) of relatively high reception power (and/or PSBCH(/SLSS) received on a pre-configured(/signaled) specific resource (e.g., "in-coverage PSBCH" detected on a resource 1) and/or "in-coverage PSBCH" (or "out-coverage PSBCH")), in the remaining resources (e.g., the resource 3 is used upon detecting PSBCH(/SLSS) of relatively high reception power on the resource 2) (and/or a pre-configured(/signaled) specific resource) other than a resource on which PSBCH(/SLSS) of relatively high reception power is detected from SLSS/PSBCH ((relay-)transmitted from the UE 2) received on the resource 2 and the resource 3.

The UE 3 relay-transmits SLSS/PSBCH based on "IN-COVERAGE indicator=0, SLSS ID=168".

Figure 10:
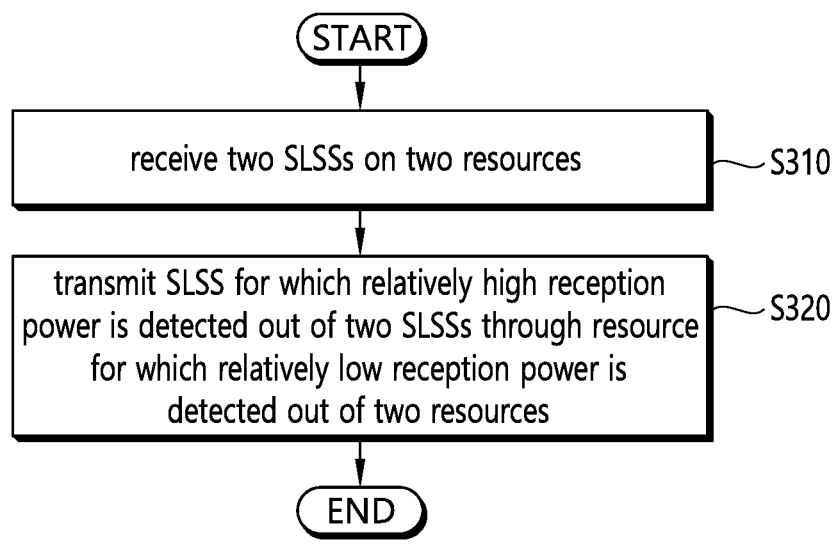
FIG. 10 exemplifies an SLSS(PSBCH) transmission method of a UE, which is a normalization of the situation of FIG. 9.

FIG. 10 exemplifies an SLSS(PSBCH) transmission method of a UE, which is a normalization of the situation of FIG. 9.

Referring to FIG. 10, the UE may receive two SLSSs on two resources (S310). In this case, the UE may transmit/relay SLSS for which relatively high reception power is detected out of the two SLSSs, through a resource for which relatively low reception power is detected out of the two resources (S320).

Figure 11:
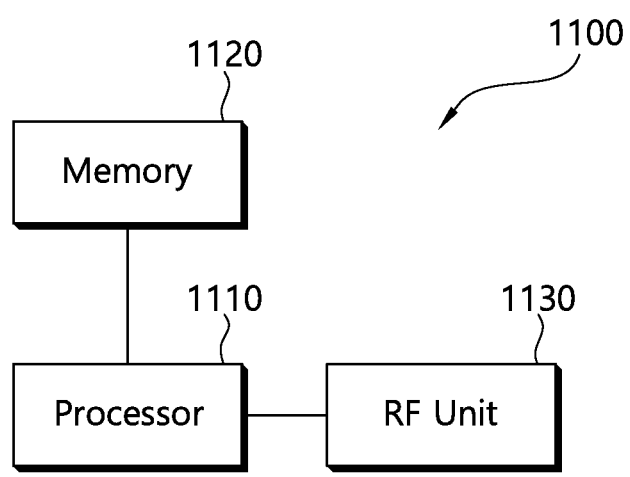
FIG. 11 is a block diagram showing a device according to an embodiment of the present invention.

FIG. 11 is a block diagram showing a device according to an embodiment of the present invention.

Referring to FIG. 11, a device 1100 includes a processor 1110, a memory 1120, and a radio frequency (RF) unit 1130. The processor 1110 implements proposed functions, procedures, and/or methods. The device 1100 may be a UE or a BS.

The RF unit 1130 is coupled to the processor 1110 to transmit and receive a radio signal. The RF unit 1130 may also be referred to as a transceiver.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. Although the proposed method is described on the basis of a 3GPP LTE/LTE-A system for convenience of explanation, a system to which the proposed method is applied can also be extended to another system other than the 3GPP LTE/LTE-A system. For example, the proposed methods of the present invention can also be extendedly applied for D2D communication. Herein, the D2D communication implies that a UE communicates with a different UE directly by using a radio channel. Although the UE implies a UE of a user, when a network device such as a BS transmits/receives a signal according to a communication scheme between UEs, it may also be regarded as a sort of the UE.

In addition, the proposed methods of the present invention may be limitedly applied only to a mode-2 V2X operation (and/or a mode-1 V2X operation). In addition, for example, the proposed methods of the present invention may be extendedly applied not only to a V2V mode-1(/mode-2) dynamic scheduling operation but also to a V2V mode-1(/mode-2) semi-persistent scheduling (SPS) operation (and/or a V2X mode-1(/mode-2) dynamic scheduling operation and/or a V2X mode-1(/mode-2) SPS operation).

In addition, the proposed methods of the present invention may be limitedly applied only to an OOC (and/or INC) V2X UE (and/or a GNSS synchronization reference V2X UE). The proposed methods of the present invention may be extendedly applied to an "in-coverage UE" (and/or an "out-coverage UE").

What is claimed is:

1. A sidelink synchronization signal (SLSS) transmission method performed by a terminal in a wireless communication system, the method comprising:
   synchronizing with a single source among a plurality of sources;
   generating the SLSS; and
   transmitting the generated SLSS in a single resource among a plurality of resources,
   wherein the single resource is determined according to whether the single source and the terminal are in cell coverage,
   wherein the plurality of resources comprise a first resource, a second resource, and a third resource,
   wherein the first resource is selected based on the terminal being in cell coverage and the single source being a base station or a global navigation satellite system (GNSS),
   wherein the second resource is selected based on the terminal being out of cell coverage and the single source being another terminal in the cell coverage, and
   wherein the third resource is selected based on the terminal being out of cell coverage and the single source being the GNSS.

2. The method of claim 1, wherein the single source is the base station, another terminal, or the GNSS.

3. The method of claim 1, wherein a physical sidelink broadcast channel (PSBCH) is transmitted together with the SLSS.

4. The method of claim 3, wherein an indicator indicating whether the terminal is in cell coverage is transmitted through the PSBCH.

5. The method of claim 1, wherein the SLSS is generated based on an SLSS identity (ID).

6. The method of claim 5, wherein based on the single source being the GNSS, the SLSS ID is a specific value.

7. A terminal comprising:
   a transceiver configured to transmit and receive a radio signal; and
   a processor operatively coupled to the transceiver, wherein the processor is configured to:
   synchronize with a single source among a plurality of sources;
   generate the SLSS and transmit the generated SLSS in a single resource among a plurality of resources,
   wherein the single resource is determined according to whether the single source and the terminal are in cell coverage,
   wherein the plurality of resources comprise a first resource, a second resource, and a third resource,
   wherein the first resource is selected based on the terminal being in cell coverage and the single source being a base station or a global navigation satellite system (GNSS),
   wherein the second resource is selected based on the terminal being out of cell coverage and the single source being another terminal in the cell coverage, and
   wherein the third resource is selected based on the terminal being out of cell coverage and the single source being the GNSS.

* * * * *